United States Patent [19]
Hanneman et al.

[11] Patent Number: 5,436,061
[45] Date of Patent: Jul. 25, 1995

[54] LOW-VOLATILITY PRESSURE SENSITIVE ADHESIVES

[75] Inventors: Larry F. Hanneman, Midland County, Mich.; Val Krukonis, Middlesex County, Mass.; Thomas J. Tangney, Midland County, Mich.; James J. Watkins, Middlesex County, Mass.

[73] Assignee: Dow Corning Corporation, Midland, Mich.

[21] Appl. No.: 113,001

[22] Filed: Aug. 30, 1993

Related U.S. Application Data

[62] Division of Ser. No. 779,230, Oct. 18, 1991.

[51] Int. Cl.6 .................. B32B 7/12; B32B 15/04; B05D 5/10
[52] U.S. Cl. .................. 427/208.4; 428/40; 428/343; 428/349
[58] Field of Search .......... 427/391, 411, 207.1, 427/208, 226, 377, 379, 389; 428/40, 343, 349

[56] References Cited

U.S. PATENT DOCUMENTS

| | | | |
|---|---|---|---|
| 2,676,182 | 4/1954 | Dault et al. | 260/448 |
| 3,627,851 | 12/1971 | Brady | 260/825 |
| 3,772,247 | 11/1973 | Flannigan | 260/46.5 |
| 4,736,048 | 4/1988 | Brown et al. | 556/454 |
| 4,842,902 | 6/1989 | Brown et al. | 427/387 |
| 4,889,753 | 12/1989 | Brown et al. | 428/40 |
| 4,968,766 | 11/1990 | Kendziorski | 528/32 |
| 4,980,443 | 12/1990 | Kendziorski et al. | 528/31 |
| 5,118,530 | 6/1992 | Hanneman et al. | 427/226 |

FOREIGN PATENT DOCUMENTS

| | | |
|---|---|---|
| 0255226 | 6/1987 | European Pat. Off. . |
| 370689 | 5/1990 | European Pat. Off. . |
| 435328 | 7/1991 | European Pat. Off. . |
| 90/06189 | 6/1990 | WIPO . |

OTHER PUBLICATIONS

McHugh and Krukonis, "Supercritical Fluid Extraction", Chapter 9, Butterworth Publishers, 1986.

Primary Examiner—George F. Lesmes
Assistant Examiner—Kathryne E. Shelborne
Attorney, Agent, or Firm—Sharon K. Severance

[57] ABSTRACT

Pressure sensitive adhesives (PSA) having a reduced volatile fraction content are provided by a process which comprises extracting a cured PSA with a fluid in or near its supercritical state. The process provides PSAs and articles containing PSAs which meet the volatility requirements of ASTM E-595. A silicone PSA transfer film having utility in outer space is obtained.

8 Claims, 1 Drawing Sheet

LOW-VOLATILITY PRESSURE SENSITIVE ADHESIVES

This is a divisional of application Ser. No. 07/779,230 filed on Oct. 18, 1991 still pending.

BACKGROUND OF THE INVENTION

The present invention relates to pressure sensitive adhesives (PSAs) and, in particular, to silicone pressure sensitive adhesives (SPSAs) having a reduced volatile fraction content, to the resulting adhesives and articles bearing same, and to process for reducing the low molecular weight fraction content of a cured PSA. In a preferred embodiment the present invention relates to an article comprising a low volatility SPSA disposed on a substrate.

In general, PSAs are comprised of a resin component, a polymer component and a curing agent component, in addition to various optional components, such as a solvent. One or more of these components contain low molecular weight fractions, the presence of which in the cured PSA can have a deleterious effect on the usefulness of the PSA.

For example, when a PSA is exposed to the hard vacuum of space these low molecular weight fractions can evaporate, during the lifetime of a vehicle to which the PSA has been applied, and can condense on cold surfaces thereof. The performance of optical surfaces on the vehicle, in particular, are significantly degraded by such deposits.

For another example, when a PSA has been applied to a surface these low molecular weight fractions can migrate at standard temperatures and pressures from the position where the PSA has been applied to adjoining regions where they exert undesirable effects, such as surface contamination.

Clearly, there exists a need for PSAs having a reduced content of low molecular weight fractions.

An uncured PSA is typically applied to a substrate, such as a backing or a release liner, and cured to a crosslinked polymer network before it is used in its ultimate application. Consequently, the low molecular weight fractions thereof are impossible to remove by evaporation, even at reduced pressure and elevated temperature. On the other hand, removal of the low molecular weight fractions from the components of the PSA prior to preparing the uncured PSA or from the uncured PSA is of no avail because the chemical reaction that is used to cure the PSA and/or the solvent that is used to aid in the application of the PSA are sources of low molecular weight fractions.

McHugh and Krukonis, "Supercritical Fluid Extraction", Chapter 9, Butterworth Publishers, 1986, have reported that supercritical fluid extraction (SCFE) has been use to extract low molecular weight materials from silicone oil to an extent unattainable by molecular distillation. These authors also report that, while the SCFE process is an adjustable process, leading to selective dissolving powers, its efficacy is also highly dependent on the molecular structure of silicone oil. The authors are silent as to the application of SCFE to cured silicone compositions, such as SPSAs.

Copley et al., European Patent Application 255,226, discloses the use of SCFE to fractionate a silicone resin into fractions of varying molecular weight and the use of those fractions to prepare SPSAs. Although one or more of these fractions may be sufficiently free of low molecular weight fractions to meet many low-volatility requirements, the other components of the SPSAs of Copley et al. are not.

BRIEF SUMMARY OF THE INVENTION

It is an object of this invention to provide new SPSAs having improved properties. It is another object of this invention to provide PSAs having reduced volatility. It is a particular object of this invention to provide SPSAs which meet the volatility requirements for outer space, as described in ASTM E-595. It is yet another object of this invention to provide a process for providing PSAs of reduced volatility. It is a primary object of this invention to provide an article of manufacture which comprises a substrate bearing a PSA having low volatility.

The foregoing objects, and others which will become apparent to one of ordinary skill in the pressure sensitive adhesive art upon consideration of the following disclosure and appended claims, are obtained by the present invention which, briefly stated, comprises exposing a cured PSA to a fluid in or near its critical state for a sufficient length of time to dissolve at least a portion of the volatile fractions of the cured PSA in the fluid, and then separating the volatile fraction-laden fluid from the PSA.

DETAILED DESCRIPTION OF THE INVENTION

The present invention relates to an article of manufacture comprising a substrate having disposed on at least some of the surface thereof a layer of a pressure sensitive adhesive having a total mass loss of less than 1 percent by weight and a collected volatile condensable material content of less than 0.1 percent by weight, both based on the weight of the pressure sensitive adhesive, when the pressure sensitive adhesive is heated to a temperature of 125° C. and a pressure of less than $5 \times 10^{-5}$ torr for 24 hours.

The article of manufacture of this invention can comprise any solid substrate and any PSA provided the PSA will adhere to the substrate, at least sufficiently to allow the article to be used in the usual manner, and has the required total mass loss (TML) and collected volatile condensable material (CVCM), as described below.

The substrate can have any useful form and can be made of any useful material. Examples of suitable substrate forms include, but are not limited to, a flexible support layer, such as a backing; a peelable adhesive-protecting layer, such as a release liner; or an article having utility in addition to supporting the adhesive, such as a medical, electronic, optical, decorative and/or mechanical device or component thereof.

Examples of suitable substrate materials include, but are not limited to, metals and alloys, such as ferrous metals, such as iron and steel, non-ferrous base metals such as aluminum, nickel, titanium, copper, magnesium, brass, silicon, germanium and tin, and precious metals, such as gold, silver and platinum; siliceous materials, such as quartz or glass in fiber or sheet form; polymeric materials; such as polyolefins, such as polytetrafluoroethylene, polyvinyl chloride or acetate, polyvinylidene chloride, polystyrene, polybutadiene, polymethacrylates, polyethylene, polypropylene, polyacrylates, polyisoprene, polyvinylethers, and polychloroprene, and condensation polymers, such as polyamides, polyimides, polycarbonates and polyesters; metal- coated polymeric materials, such as a foil-backed polyolefin or condensation polymer; cellulosic materials, such as paper; and composite materials, such as fiber-reinforced polymeric materials.

In a preferred embodiment of this invention the substrate comprises at least one flexible material which bears a release coating to which the PSA has been, or is intended to be, releasably adhered for the purposes of temporarily protecting the PSA and subsequently allowing the substrate to be separated from the PSA, thereby exposing the PSA for further use.

For example, a preferred embodiment of this invention is an adhesive transfer film. As is well known, an adhesive transfer film comprises a PSA which is not durably adhered to any substrate, but is preferably releasably adhered to at least one substrate. A surface of the PSA of an adhesive transfer film is typically exposed, for example by removing a releasably adhered substrate, and the exposed PSA is then durably adhered to, for example, a utility substrate, delineated above. Thereafter another surface of the PSA is typically exposed by removing another releasably adhered substrate and the exposed PSA is then durably adhered to another utility substrate. The adhesive transfer film can have any form such as a self-wound coil comprising a double-sided release liner, a coil containing two single-sided release liners, a sheet comprising two single-sided release liners, and a laminate of two or more PSA layers separated by double-sided release liners.

In another preferred embodiment the article of this invention is an adhesive tape. As is well known, an adhesive tape comprises a PSA which is durably adhered to one side of a support and releasably adhered to another side of the support.

The release coating can be any of the adhesive release coatings known in the art. For OPSAs, it is preferred that the release coating comprise a cured methylsilicone composition. For SPSAs, it is preferred that the release coating comprise a cured fluorine-containing composition, such as a fluorosilicone composition. Methylsilicone compositions and fluorine-containing compositions for adhesive release are well known in the pressure sensitive adhesives art and need no extensive delineation herein; many are commercially available. Briefly, methylsilicone release coating compositions comprised a polydimethylsiloxane fluid or gum which bears reactive sites, typically hydroxyl or vinyl radicals, by which a curing reaction is accomplished. Fluorosilicone release coatings are similar to methylsilicone coating except that the polydimethylsiloxane has a large portion of its methyl radicals replaced by fluoroalkyl radicals.

In a preferred embodiment of this invention the release coating is a cured fluorosilicone composition in accordance with the teachings of Brown and Stickles, U.S. Pat. Nos. 4,736,048; 4,842,902 and 4,889,753; and the teachings of Kendziorski, U.S. Ser. No. 296,468, filed on Jan. 12, 1989; said patents being incorporated herein by reference to teach how to prepare fluorosilicone release coatings.

The release coating, if present, that forms a part of this invention must release the PSA that is adhered thereto, with a force of no more than 500, preferably no more than 200 and more preferably no more than 100 grams per inch, as measured by the method stated below.

The PSA that forms a part of the article of this invention can be any pressure sensitive adhesive that has a TML content of less than 1 percent by weight and a CVCM content of less than 0.1 percent by weight, both based on the weight of the pressure sensitive adhesive.

By TML and CVCM it is meant the percentages of the weight of the PSA that is evolved and collected, respectively, when the PSA is tested in accordance with ASTM E-595, incorporated herein by reference. Briefly, ASTM E-595 requires that the material to be tested be heated to a temperature of 125° C. at a pressure of less than $5 \times 10^{-5}$ torr for 24 hours in a vessel which also contains a collector surface maintained at a temperature of 25° C. The TML content is determined by weighing the PSA, before and after such a heating, and expressing the weight loss as a percentage of the original weight of the PSA. The CVCM content is determined by weighing the material collected after such a heating, and expressing the amount collected as a percentage of the original weight of the PSA.

The PSA that forms a part of the article of this invention must be prepared by the process of this invention, delineated below, because the PSAs of the art contain more than 1 weight percent TML content and/or more than 0.1 weight percent CVCM content and there is no known process that will provide a PSA having the TML and CVCM contents required by the article of this invention.

SPSAs are preferred PSAs for the article of this invention because of their inherent properties, such as stability at high temperature and flexibility at low temperature. Briefly, SPSAs are formed from a mixture of a silicone resin, a silicone fluid or gum and, typically, a curing agent to improve one or more properties of the SPSA.

The PSA that forms a part of this invention must have one or more useful properties, such as adhesive strength, tack, shear strength or combinations of two or more of such useful properties. The adhesive strength of a PSA should be at least 10, preferably at least 20, and more preferably at least 40 ounces per inch, as measured by the method stated below. The tack of a PSA should be at least 100, preferably at least 500 and more preferably at least 1000 grams per square centimeter, as measured by the method stated below. The shear strength of a PSA should be at least 1, preferably at least 10, and more preferably at least 100 days at 350° F., as measured by the method stated below.

The PSA that forms a part of this invention must release from the release coating, if present, with a force of no more than 500, preferably no more than 200 and more preferably no more than 100 grams per inch, as measured by the method stated below.

The article of this invention can be manufactured by any suitable process that will provide a low-volatility PSA disposed on a suitable substrate. For example, the article of this invention can be manufactured by disposing a PSA onto a suitable substrate and then applying the process of this invention to the combination of substrate and PSA to sufficiently reduce the volatile fraction content of the PSA. Of course, the substrate must be able to survive the SCFE process of this invention sufficiently to allow for its eventual use. Alternatively, the PSA can be prepared by the process of this invention and subsequently transferred to a a suitable substrate to provide an article of this invention.

As stated above, the PSA that forms a part of the article of this invention must be prepared by the process of this invention. Thus, the present invention further relates to a process comprising (a) bringing a cured pressure sensitive adhesive having a volatile fraction content into contact with a fluid in or near its supercritical state, in a pressure vessel, for a time sufficient to dissolve at least a portion of the volatile fraction in the fluid; (b) separating the pressure sensitive adhesive and the fluid containing a volatile fraction; and (c) recovering a pressure sensitive having a reduced volatile fraction content.

The process of this invention is applicable to any cured PSA that contains a volatile fraction content. By volatile fraction it is meant any component in the PSA that will contribute to the total mass loss (TML) of the PSA, as delineated above.

Examples of cured PSAs that can be used in the process of this invention include, but are not limited to, organic pressure sensitive adhesives (OPSAs), such as the well-known acrylate-based OPSAs, SPSAs disclosed in, for example, U.S. Pat. Nos. 2,736,721; 2,814,601; 2,857,356; 3,528,940; 3,839,075; 3,929,704; 3,983,298; 4,309,520; 4,584,355; 4,591,622; 4,774,297; British Patent No. 998,232; European Patent Application No. 255,226; and Japanese Patent Application No. 283,343/86.

In the process of this invention a cured PSA is contacted with a fluid, which is in or near its supercritical state. By the expression "near its supercritical state" it is meant a fluid whose temperature and pressure are slightly less than its critical temperature and pressure. The supercritical state of a fluid is, as is well known, the state occupied by a fluid whose temperature and pressure are at or above the critical temperature and pressure of the fluid. The critical temperature and pressure of fluids are well known and can be found in many science handbooks and encyclopedias.

The fluid can be any of the gases or liquids typically used in SCFE procedures, examples of which include, but are not limited to, carbon dioxide, ethane, ethylene, propane, butane, xenon, nitrous oxide, chlorotrifluoromethane and mixtures of two or more such fluids. Carbon dioxide is a preferred fluid for the process of this invention.

The process of this invention must be conducted under conditions of temperature, pressure and time so that at least a portion of the volatile fraction content of a cured PSA is removed from the PSA and so that the resulting PSA retains useful adhesive properties. It accordance with this invention it has been discovered that, for any particular PSA, conducting a few experiments involving the varying of temperature, pressure and contact time, taken with this disclosure, will disclose the conditions needed to obtain a useful PSA having a desired reduction of volatile fraction content because there appears to be a general direct relationship between the SCFE conditions to which a PSA is exposed and the degree of volatile fraction removal and adhesive property loss that the PSA experiences during SCFE.

Although being dependent on the particular PSA that is being exposed to SCFE process, the conditions to be used in the process of this invention when $CO_2$ is used as the fluid are generally limited to temperatures ranging up to 120° C., preferably 60° to 100° C., most preferably 80° C., and pressures ranging up to 6000, preferably 1500 to 4000, and most preferably 2000 to 3000 psig.

The process of this invention can be conducted under substantially isobaric conditions; however, if it is desired to provide a PSA which meets the volatility requirements of ASTM E-595 in an economical manner, it appears necessary to vary the fluid pressure in a periodic manner while the fluid is in contact with the PSA. In this periodic manner the pressure of the fluid is varied about a desired pressure such as, for example, 2000 psig. Typically, the rate of pressure increase is less than the rate of pressure decrease and there is no extended period of constant fluid pressure. This manner of controlling the fluid pressure increases the amount and rate of removal of volatile fractions from the PSA being processed. While not limiting the present invention by any particular theory we believe that this manner of varying the fluid pressure has a mechanical effect on the cured PSA which results in a convective flow of the working fluid within the PSA. Accordingly, the pressure can be increased and decreased over a pressure range of, for example, at least about 100 psig in a sinusodial manner, square wave manner, saw-tooth wave manner or any combination thereof, over a period of, for example, from 5 minutes to 1 hour per cycle. One or more cycles can be used, as desired.

The process of contacting a PSA with a fluid in or near its supercritical state is conducted in a suitable pressure vessel, using any effective means such as passing the fluid over the surfaces of the cured PSA, for effecting contact of the fluid with the PSA. The fluid can be passed through the pressure vessel, and over the surface of the PSA, in a unidirectional manner for the entire contacting period or in a bidirectional manner wherein the fluid is passed in one direction for a portion of the contacting period and in a direction substantially opposite to the previous direction for another portion of the contacting period or in a manner comprising one or more periods of unidirectional flow interspersed with one or more periods of bidirectional flow. It has been found that, with large surfaces of PSA, a down-stream gradient of properties of the extracted PSA is obtained when the unidirectional extraction process is stopped short of equilibrium. To solve this problem a bidirectional flow of fluid is recommended.

The volume of fluid, and its flow rate, are not critical and can be selected as desired. Typically, the larger the mass of fluid per mass of PSA, the quicker and larger the removal of volatile fractions.

After the fluid has contacted the PSA for the desired length of time it is separated from the PSA such as by removing it from the pressure vessel by known means and releasing it from its supercritical state by reducing its pressure sufficiently. The volatile fractions dissolved in the fluid can be recovered and the fluid reused, if desired.

For any particular PSA the volatile fraction that is removed from the PSA by the process of this invention will vary in molecular weight and in composition, depending upon the conditions used in the SCFE process. Typically, the recovered volatile fraction comprises the lower-molecular weight components of the PSA. For SPSAs the $M_n$ of the recovered volatile fraction typically falls within the range of from 800–1000, more frequently 850–950.

After the fluid has been separated the PSA is removed from the pressure vessel and, preferably after having been allowed to vent dissolved fluid, typically is then adhered, durably or releasably, to a substrate such as a release liner or a backing.

The present invention further relates to a pressure sensitive adhesive having a reduced volatile fraction content that has been produced by the process of this invention. The process of the present invention can be practiced in any manner and with any PSA as long as the volatile fraction content of the PSA is reduced by the process.

The PSA of this invention is conveniently prepared by adhering a PSA to a substrate and applying the process of this invention to the combination of the substrate and the PSA. When the process of this invention is practiced with this combination so as to provide a PSA having a TML of less that 1 percent by weight and a CVCM of less than 0.1 percent by weight, as delineated above, an article of this invention is obtained. Alternatively, an article that has been prepared by the process of this invention, but does not comprise a PSA having a TML content of less than 1 percent and/or CVCM content of less than 0.1 percent, is an article of this invention if it is not available by a known process.

As noted above, curable SPSA compositions are comprised of a silicone resin component, a silicone polymer component and a curing agent component, along with varying amounts of solvent to aid in the preparation and use of the composition.

In a preferred embodiment of this invention the SPSA is comprised of an organopolysiloxane resin which has a molecular weight which is less than those used in known SPSA compositions, and preferably used in an amount which is more than used for organopolysiloxane resins of the art, a polydiorganosiloxane, and a reactive curing agent. This preferred SPSA is the subject of cofiled applications for US patent entitled "Silicone Pressure Sensitive Adhesives Having High Adhesive Strength" and "Silicone Pressure Sensitive Adhesives Having High Shear Strength", each assigned to the assignee of this invention. Said cofiled applications are incorporated herein by reference to fully delineate said preferred SPSA.

Briefly, this preferred SPSA comprises 60–90, preferably 72–85 parts by weight of a silicone resin and 10–40, preferably 15–28 parts by weight of a silicone polymer and an effective amount of a curing agent for the composition.

The silicone resin is a soluble organopolysiloxane, preferably having a silicon-bonded hydroxyl content of less than 1 percent by weight, a $M_n$ value of from 900 to 1,600, as measured by the method delineated herein, and consists essentially of $R_3SiO_{\frac{1}{2}}$ siloxane units and $SiO_{\frac{4}{2}}$ siloxane units. R denotes a monovalent radical free of aliphatic unsaturation selected from the group consisting of hydrocarbon and halogenated hydrocarbon radicals, at last $\frac{1}{3}$ of which are methyl. The mol ratio of $R_3SiO_{\frac{1}{2}}$ siloxane units to $SiO_{\frac{4}{2}}$ siloxane units in the soluble organopolysiloxane has a value of from 1.1/1 to 1.4/1.

The silicone polymer is a polydiorganosiloxane having the general formula $R^1R^2{}_2SiO(R^2{}_2SiO)_nSiR^2{}_2R^1$. $R^2$ denotes a monovalent radical selected from the group consisting of hydrocarbon and halogenated hydrocarbon radicals, at least $\frac{1}{2}$ of all which are methyl. $R^1$ denotes a radical selected from the group consisting of $R^2$ radicals and OH radicals and the subscript n is a number having an average value of greater than zero.

The silicone resin preferably consists essentially of $(CH_3)_3SiO_{\frac{1}{2}}$ siloxane units and $SiO_{\frac{4}{2}}$ siloxane units and the silicone polymer is preferably a polydiorganosiloxane having the general formula $R''R'{}_2SiO(R'{}_2SiO)_b SiR'{}_2R''$ wherein each $R'$ denotes methyl, phenyl or alkenyl, at least 90 percent of which are the methyl radical, each $R''$ denotes a radical selected from the group consisting of $R'$ radicals and OH radicals. The curing agent is preferably an organohydrogenpolysiloxane having an average of at least 2 silcon-bonded hydrogen atoms in each molecule, such as $Me_3SiO(MeHSiO)_c(Me_2SiO)_dSiOe_3$ wherein c has an average value of 2 or more and d has an average value of 0 or more.

The silicone resin is preferably prepared by the silica hydrosol capping process of Daudt, et al., U.S. Pat. No. 2,676,182; as modified by Brady, U.S. Pat. No. 3,627,851; and Flannigan, U.S. Pat. No. 3,772,247; each patent being incorporated herein by reference to teach how to prepare soluble organopolysiloxanes which consist essentially of $R_3SiO_{\frac{1}{2}}$ siloxane units and $SiO_{\frac{4}{2}}$ siloxane units and have a $M_n$ value of from 900 to 1,600.

Briefly stated, the modified process of Daudt et al. comprises limiting the concentration of the sodium silicate solution, and/or the silicon-to-sodium ratio in the sodium silicate and/or the time before capping the neutralized sodium silicate solution to generally lower values than those disclosed by Daudt, et al. in order to prevent excessive growth of the silica particle and to obtain a soluble organopolysiloxane having the required $M_n$. Thus for the purposes of this invention the silicate concentration is generally to be limited to a value of from 40 to 120, preferably from 60 to 100 and most preferably around 75 grams/liter; the neutralized silica hydrosol is to be stabilized with alcohol and capped with $R_3SiO_{\frac{1}{2}}$ siloxane units as soon as possible, preferably within 30 seonds, after it has been neutralized; and the sodium silicate is to have the formula $Na_2O \cdot xSiO_2$ wherein x has a value of from 2 to less than 3.5.

The following examples are disclosed to illustrate, but not limit, the present invention which is properly delineated by the appended claims. Unless otherwise stated ratios, parts and percents are by weight, temperatures are degrees Celsius, pressures are in psig, and volumes of $CO_2$ are in hectoliters at STP.

Measurement of Non-volatile Content and MW of PSA Components

Non-volatile content of a component was determined by heating a 2-gram sample of material to 150° for 1 hour and expressing the weight of the residue as a percentage of the original sample weight. This is not the test for determining the TML and CVCM values of a PSA of this invention.

Molecular weights of resins and extracted materials were measured by gel-permeation chromatography using Varian TSK 4000+2500 columns at 35°, a chloroform mobile phase at 1 mL/m and an IR detector set at 8.5 microns to detect $SiO2$. Polystyrene standards (for resins) and polydimethylsiloxane standards (for extracted materials) were used for linear regression calibrations of molecular weights. When summation endpoints were selected so as to exclude the non-resinous portion $(Me_3SiO)_4Si$ of the chromatogram from the molecular weight calculations the molecular weights are designated by the symbols $M_n$, $M_z$, $M_w$ and peak $M_w$. When summation endpoints were selected so as to include the entire chromatogram in the molecular weight calculations the molecular weights are designated by the symbols $M'_n$, $M'_z$, $M'_w$ and peak $M'_z$.

Supercritical Fluid Extraction

SCFE extraction was conducted in a pressure vessel fitted with inlet and outlet ports for the passage of $CO_2$ through the vessel in a continuous unidirectional or bidirectional manner. A substrate containing an exposed, 1–5 mil thick layer of PSA was placed in the vessel and $CO_2$ was pumped into the vessel and heated to the desired temperature. The pressure of $CO_2$ in the vessel was controlled in one or more of the following manners: unidirectional flow, bidirectional flow, constant pressure and variable pressure. Temperature was kept constant as much as possible. The $CO_2$ exiting from the vessel was gradually released from its supercritical state and the recovered volatile fraction was collected in a flask, weight and analyzed by gel permeation chromatography.

Measurement of Adhesion, Tack, Hold Time, TML and CVCM

Adhesion of a cured PSA was measured by applying an 6"×1" strip of the Kapton- or Mylar-backed adhesive to a clean 2"×6" stainless steel panel using two passes of a 2 kg rubber-coated roller. The force required to remove the tape therefrom was measured with Keil Tester at an peel angle of 180° at a rate of 12 inches/minute. The values recorded are the average of multiple readings taken during the course of one pull per sample. The Keil Tester is described in TAPPI, vol. 43, No. 8. pages 164A and 165A (August 1960). The readings were taken in units of ounces per inch (oz/in).

Tack was measured on 5-1" squares of the Kapton- or Mylar-backed adhesive using a POLYKEN (R) brand probe tack tester (Testing Machines, Inc.; Amityville, N.Y.). The test procedure used a 20 gram weight, a dwell time of 0.5 seconds and a pull speed of 0.5 cm/sec. and the results are the average of the five readings expressed in units of grams/cm² (g/cm²).

Total mass loss (TML) and collected volatile condensable material (CVCM) were measured according to ASTM E-595 and are expressed in percent by weight, based on the weight of the sample being tested.

Materials

The following linear polydiorganosiloxanes, resinous organopolysiloxanes and adhesives were used in the examples, as noted. All polymers are gums having a plasticity number of 140–165, as measured by ASTM 926-67, and viscosities of at least 10,000,000 centipoise at 25° C.

Polymer A—A dimethyl-co-phenylmethylpolysiloxane having dimethylvinylsiloxy endgroups, a vinyl content of 0.0065% and a phenylmethylsiloxy content of 7.5M %.

Polymer B—A 9/1 blend of a dimethyl-co-methylvinylpolysiloxane having dimethylvinylsiloxy endgroups and a vinyl content of 0.05% and a dimethylpolysiloxane having dimethylvinylsiloxy endgroups and a vinyl content of 0.0065%.

Polymer C—A dimethyl-co-methylvinylpolysiloxane having dimethylvinylsiloxy endgroups and a methylvinylsiloxy content of 2M %.

Polymer D—A dimethyl-co-methylvinylpolysiloxane having dimethylvinylsiloxy endgroups and a methylvinylsiloxy content of 0.03M % and a total vinyl content of 0.016%.

Polymer E—A dimethylpolysiloxane having hydroxyl endgroups.

Resin A—A soluble organopolysiloxane consisting of $(CH_3)_3SiO_{\frac{1}{2}}$ units and $SiO_{\frac{4}{2}}$ units in a mol ratio 0.8/1 and having $M_n = 1,963$, $M_w/M_n = 2.57$ and a hydroxyl content of 3.45%.

Resin B—Resin A which has been reacted with hexamethyldisilazane to reduce its hydroxyl content to less than 1 percent.

Resin C—A soluble organopolysiloxane consisting of $(CH_3)_3SiO_{\frac{1}{2}}$ units and $SiO_{\frac{4}{2}}$ units in a mol ratio 1.1/1 and having $M_n = 1,304$, $M_w/M_n = 1.80$ and a hydroxyl content of 2.11%.

Resin D—Resin C which has been reacted with hexamethyldisilazane to reduce its hydroxyl content to less than 1 percent.

Adhesive 1—An addition-curing SPSA consisting of 182.4 parts of Resin D, 43.2 parts of Polymer C, 0.4 parts of a trimethylsiloxy-terminated methylhydrogen polysiloxane having a viscosity of about 20 centipoise and containing 1.6% silicon-bonded hydrogen atoms, (SiH/SiVi=0.5/1), 0.28 parts diethyl fumarate reaction inhibitor; and 73.7 parts of xylene. This adhesive is catalyzed with 0.15% of a chloroplatinic acid-vinylsiloxane complex.

Adhesive 2—An addition-curing SPSA consisting of 56.9 parts of Resin B, 8 parts of Resin C, 25 parts of Polymer A, 0.2 parts of a trimethylsiloxy-terminated methylhydrogen polysiloxane having a viscosity of about 20 centipoise and containing 1.6% silicon-bonded hydrogen atoms, (SiH/SiVi=51/1), 0.2 parts phenylbutynol reaction inhibitor, and 9.6 parts of xylene. This adhesive is catalyzed with 0.9% of a 50% solution in toluene of a chloroplatinic acid-vinylsiloxane complex.

Adhesive 3—An addition-curing SPSA consisting of 55 parts of Resin B, 25 parts of Polymer D, 0.2 parts of a trimethylsiloxy-terminated methylhydrogen polysiloxane having a viscosity of about 20 centipoise and containing 1.6% silicon-bonded hydrogen atoms, (SiH/SiVi=21/1), 0.2 parts 3,5-dimethyl-1-hexyne-3-ene reaction inhibitor; and 19.6 parts of toluene. This adhesive is catalyzed with 0.9% of a chloroplatinic acid-vinylsiloxane complex.

Adhesive 4—A peroxide-curing SPSA consisting of 23 parts of Resin A and 17 parts of Polymer E, dissolved in 60 parts of xylene and catalyzed with 2% benzoyl peroxide.

Adhesive 5—A platinum-containing, addition-curing SPSA consisting of 187.5 parts of Resin D, 62.5 parts of Polymer B, 6 parts of a trimethylsiloxy-terminated methylhydrogen-co-dimethylpolysiloxane having a viscosity of about 20 centipoise and containing 1.03% silicon-bonded hydrogen atoms, (SiH/SiVi=57/1), 5 parts diethyl fumarate reaction inhibitor; and 250 parts toluene. This adhesive is catalyzed with 0.9% of a chloroplatinic acid-vinylsiloxane complex.

EXAMPLES 1 TO 6

Adhesive 1 was catalyzed, as noted above, and cast onto 1-mil Mylar, 2-mil Kapton and fluorosilicone release liner to provide an adhesive thickness of 2 mils and cure at 130° for 4 minutes. The adhesion & tack values for Kapton-backed and Mylar-backed adhesive were 43 & 918 and 75 & 1488, respectively. The liner-backed adhesive was extracted under various SCFE conditions and the adhesion, TML and CVCM values were measured on the cooled, degassed adhesive. Results, listed in Table I, show that the adhesion of a SPSA that has been extracted with $CO_2$ under supercritical conditions has an adhesive strength that varies with the pressure when the temperature is held at 80°.

TABLE I

| | Extraction Conditions | | | Adhesive Props. | | |
|---|---|---|---|---|---|---|
| Ex. | Temp. | Press. | Vol. | Adh. | TML | CVCM |
| 1 | 80 | 2100–2400 | 15 | 80 | 0.53 | 0.26 |
| 2 | 80 | 2200–2600 | 15 | 74 | 0.24 | 0.07 |
| 3 | 80 | 2300–2600 | 46 | 58 | 0.67 | 0.33 |
| 4 | 80 | 2400–2700 | 15 | 25 | 0.53 | 0.25 |

TABLE I-continued

| Ex. | Extraction Conditions | | | Adhesive Props. | | |
|---|---|---|---|---|---|---|
| | Temp. | Press. | Vol. | Adh. | TML | CVCM |
| 5 | 80 | 2600–2800 | 30 | 22 | 0.18 | 0.05 |
| 6 | 80 | 2700–3000 | 15 | 8 | 0.44 | 0.48 |
| * | — | — | — | 68 | — | — |

* = Unextracted sample.

EXAMPLES 7 TO 9

Adhesive 1 was catalyzed and cast onto 1-mil Mylar and fluorosilicone release liner at a dry thickness of 2 mils. The adhesion & tack values for the Mylar-backed adhesive were >72 & 1471. The subsequent adhesion and tack values for the adhesive that had been peeled from the liner were >70/1740 & 72/1450. The liner-backed adhesive was extracted under two different isobaric conditions, using 1500 standard liters of $CO_2$ and under a pulsing pressure, using 8000 standard liters of $CO_2$ over a period of 4–5 hours. The adhesive properties of the extracted article are listed in Table II. A comparing of Example 7 with Examples 4 and 5, and Example 8 with Example 6 shows the beneficial effect of a pulsing fluid pressure over isobaric fluid pressure.

TABLE II

| Ex. | Extraction Conditions | | | Adhesive Props. | | |
|---|---|---|---|---|---|---|
| | Temp. | Press. | Vol. | Adh. | TML | CVCM |
| 7 | 80 | 2650 | 15 | 64 | 0.98 | 0.45 |
| 8 | 80 | 3000 | 15 | 12 | 0.64 | 0.15 |
| 9 | 80 | 2500–2800 | 80 | >72 | 0.20 | 0.07 |
| * | — | — | — | 86 | 7.0 | 2.5 |

* = Unextracted sample.

EXAMPLES 10 TO 12

A SPSA transfer adhesive from 3M (Scotch(R) Y9732 Transfer Film) was extracted under two different isobaric conditions and at 80°, using 1500 standard liters of $CO_2$, and under a pulsing pressure, using 8000 standard liters of $CO_2$.

The material extracted under pulsing pressure conditions was analyzed by gpc and was found to have peak $M^t_w=1591$, $M^t_n=1344$, $M^t_w=1631$, $M^t_z=1944$ and $D=1.21$.

TABLE III

| Ex. | Extraction Conditions | | | Adhesive Props. | | |
|---|---|---|---|---|---|---|
| | Temp. | Press. | Vol. | Adh. | TML | CVCM |
| 10 | 80 | 2650 | 15 | 64 | 0.68 | 0.15 |
| 11 | 80 | 3000 | 15 | 40 | 0.39 | 0.16 |
| 12 | 80 | 2100–2400 | 80 | nm | nm | nm |
| * | — | — | — | 62 | 3.25 | 0.91 |

* = Unextracted sample.

EXAMPLE 13

A SPSA transfer adhesive from Adhesive Research (ARClad (R) Transfer Film) was extracted under a pressure which pulsed between 2100 and 2400 several times, using 2000 standard liters of $CO_2$. The material extracted was analyzed by gpc and was found to have peak $M^t_w=1591$, $M^t_n=1365$, $M^t_w=1654$, $M^t_z=1993$ and $D=1.21$, i.e. substantially the same molecular weight as the extracted material obtained from Example 12.

EXAMPLES 14 TO 16

Adhesive 5 was catalyzed and cast onto fluorosilicone release liner at a dry thickness of 2 mils. The liner-backed adhesive was extracted under conditions of differing severity and the resulting films were examined for volatile content and adhesion. The extracted material was examined with gpc.

TABLE IV

| Ex. | Extraction Conditions | | | Adhesive Props. | | |
|---|---|---|---|---|---|---|
| | Temp. | Press. | Vol. | Adh. | TML | CVCM |
| 14 | 80 | 1500–1800 | 15 | 51 | 3.12 | 1.68 |
| 15 | 80 | 1800–2100 | 15 | 58 | 2.32 | 1.15 |
| 16 | 80 | 2100–2400 | 15 | 34 | 0.53 | 0.23 |
| * | — | — | — | 50 | 6.35 | 3.66 |

* = Unextracted sample.

TABLE V

| Ex. | Extracted Material Molecular Weight | | | | |
|---|---|---|---|---|---|
| | Peak $M^t_w$ | $M^t_n$ | $M^t_w$ | $M^t_z$ | D |
| 14 | 1374 | 880 | 1222 | 1539 | 1.39 |
| 15 | 1507 | 956 | 1368 | 1751 | 1.43 |
| 16 | 1554 | 909 | 1365 | 1770 | 1.50 |

EXAMPLES 17 TO 26

Adhesive 2 was catalyzed, diluted to 50% solids with toluene, cast onto fluorosilicone release liner and cured for 3 minutes at 100°, cooled and was cut in two parts. One was covered with another sheet of the liner to make a fully-linered transfer film. The other half was covered with a sheet of 2-mil Mylar to make a tape stock. The release liner from each half was removed and the exposed adhesive, backed with either release liner or Mylar was extracted with 2000 standard liters of $CO_2$ to provide transfer films (Examples 18–22) and tapes (Examples 23–27), respectively.

TABLE VI

| Ex. | Extraction Conditions | | Adhesive Props. | | |
|---|---|---|---|---|---|
| | Temp. | Press. | Adh. | TML | CVCM |
| 17 | 80 | 2100–2400 | 27 | 0.108 | 0.018 |
| 18 | 80 | 1100–1250 | 56 | 2.4 | 1.281 |
| 19 | 100 | 1100–1250 | 64 | 2.616 | 1.291 |
| 20 | 100 | 2100–2400 | 25 | 0.202 | 0.075 |
| 21 | 60 | 1100–1250 | 38 | 1.009 | 0.480 |
| 22 | 60 | 2100–2400 | 13 | 0.216 | 0.037 |
| 23 | 60 | 2001–2400 | 10 | 0.329 | 0.088 |
| 24 | 60 | 2100–2400 | 21 | 0.282 | 0.068 |
| 25 | 60 | 1650–1800 | 23 | 0.214 | 0.081 |
| 26 | 60 | 1100–1250 | 63 | 3.654 | 1.698 |

EXAMPLES 27 & 28

Adhesive 3 was catalyzed and cast onto a double-sided release liner to provide a self-wound transfer tape. The tape was loosely unwound and extracted under two different conditions of pulsing pressure.

TABLE VI

| Ex. | Extraction Conditions | | Adhesive Props. | | |
|---|---|---|---|---|---|
| | Temp. | Press. | Adh. | TML | CVCM |
| 27 | 60 | 1800–2000 | 0 | 0.308 | 0.11 |
| 28 | 60 | 4500–6000 | <10 | 0.133 | 0.020 |
| 29 | 60 | 1800–2000 | 48 | * | |

*12% extracted.

EXAMPLES 29

Adhesive 4 was catalyzed and cast onto a double-sided release liners to provide a self-wound transfer tapes. The tape was loosely unwound and extracted under pulsing pressure to provide a clear tape. The results are listed in Table VI.

DESCRIPTION OF THE DRAWINGS

The article of this invention is illustrated in some of its forms by the accompanying drawings.

Figure 1:
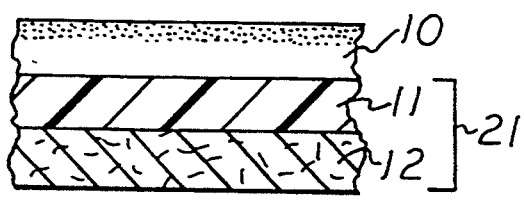
FIG. 1 is a sectional view of an article which comprises a liner (21) made up of a backing (12) bearing a durably adhered release coating (11) which is releasably adhered to a layer of PSA of this invention (10). This article can be used to position a layer of PSA onto a support to provide an article illustrated by FIG. 2, or onto additional liner to provide an article illustrated by FIG. 3. Alternatively, the article of FIG. 1 can be formed into a roll in such a manner as to durably adhere its exposed PSA to the surface of the backing that does not contain the adhesive-releasing layer, thereby forming a supported tape.
Figure 4:
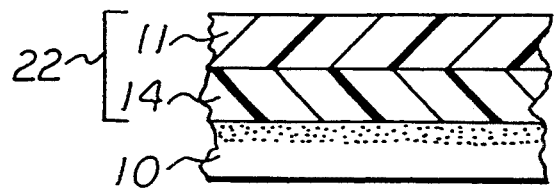
FIG. 4 is a sectional view of an article which comprises a liner/support (22) made up of a backing/support (14) bearing a durably adhered release coating (11) and a durably adhered PSA of this invention (10). The article of FIG. 4 can be formed into a roll in such a manner as to adhere its exposed PSA to the surface of the backing that contains the adhesive-releasing layer, thereby forming a tape.
Figure 2:
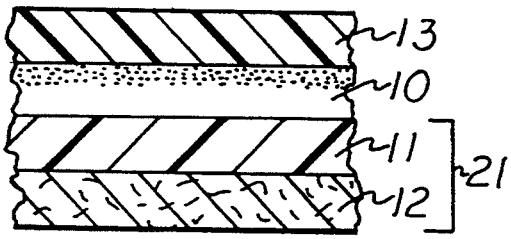
FIG. 2 is a sectional view of an article which comprises a liner (21) made up of a backing (12) bearing a durably adhered release coating (11) which is releasably adhered to a layer of PSA of this invention (10) bearing a durably adhered support (13), such as a label, an ostomy device, a medicinal reservoir, an optical component, an electronic component or an emblem.
Figure 5:
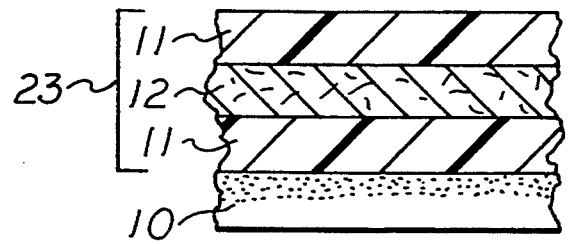
FIG. 5 is a sectional view of an article which comprises a double liner (23) made up of a backing (12) bearing a durably adhered release coating (11) on each side thereof, one coating of which is releasably adhered to a layer of PSA of this invention (10). The article of FIG. 5 can be formed into a roll in a manner such that the remaining adhesive-releasing coating is brought into releasable contact with the exposed surface of the PSA of the article, thereby forming a source of a strip of free adhesive. As with the article of FIG. 3 an article illustrated by FIG. 5 typically possesses the property of differential release.
Figure 3:
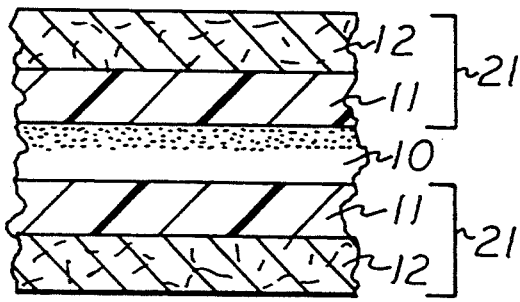
FIG. 3 is a sectional view of an article which comprises a two liners (21) each made up of a backing (12) bearing a durably adhered release coating (11) which is releasably adhered to a layer of PSA of this invention (10). An example of an item represented by this figure is a sheet or strip article for positioning a free layer of PSA onto a surface. Typically, this article has the property of differential release wherein the first-removed liner is removable from the PSA with a force substantially less than the force needed to remove the second-removed liner.
Figure 6:
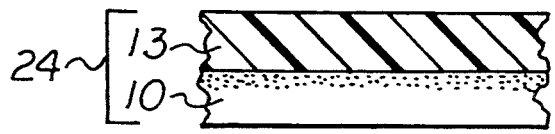
FIG. 6 is a sectional view of an article which comprises a support (13) durably adhered to a layer of PSA of this invention (10). An example of an article represented by this figure is an item to be durably adhered to another support or releasably adhered to a release liner.

That which is claimed is:

1. A process comprising
   (a) bringing a cured silicone pressure sensitive adhesive having a volatile fraction content into contact with a fluid in or near its supercritical state, in a pressure vessel, for a time sufficient to dissolve at least a portion of the volatile fraction in the fluid;
   (b) separating the pressure sensitive adhesive and the fluid containing a volatile fraction; and
   (c) recovering a pressure sensitive adhesive having a total mass loss of less than 1 percent by weight, based on the weight of the pressure sensitive adhesive, when it is heated to a temperature of 125° C. at a pressure of less than $5 \times 10^{-5}$ torr for 24 hours.

2. A process according to claim 1 wherein the cured pressure sensitive adhesive is disposed as a layer on a substrate.

3. A process according to claim 2 wherein the fluid is $CO_2$ and the contacting is conducted at a fluid temperature of up to 120° C. and at a fluid pressure of up to 6000 psig.

4. A process according to claim 3 wherein the fluid pressure in the pressure vessel is varied in a periodic manner having an amplitude of at least 100 psig and a period of at least 5 minutes while the contacting is occurring.

5. A process according to claim 4 wherein the fluid is supplied to and removed from the pressure vessel in substantially one direction for at least one period of time and in substantially the opposite direction for at least one subsequent period of time.

6. A process according to claim 1 wherein the recovered pressure sensitive adhesive has a collected volatile condensable material content of less than 0.1 percent by weight, based on the weight of the pressure sensitive adhesive, when it is heated to a temperature of 125° C. at a pressure of less than $5 \times 10^{-5}$ torr for 24 hours.

7. A process according to claim 1 wherein the pressure sensitive adhesive is releasably adhered to a fluorosilicone release liner.

8. A process according to claim 2 further comprising releasably adhering the recovered pressure sensitive adhesive to a fluorosilicone release liner.

* * * * *